United States Patent [19]

Banerjee et al.

[11] Patent Number: 5,577,228
[45] Date of Patent: Nov. 19, 1996

[54] DIGITAL CIRCUIT FOR PERFORMING MULTICYCLE ADDRESSING IN A DIGITAL MEMORY

[75] Inventors: Pradip Banerjee; Atul V. Ghia, both of San Jose; Simon Lau, Fremont; Patrick Chuang, Cupertino, all of Calif.

[73] Assignees: Sony Corporation of Japan; Sony Electronics, Inc., both of Park Ridge, N.J.

[21] Appl. No.: 351,900

[22] Filed: Dec. 8, 1994

[51] Int. Cl.⁶ .......................................................... G06F 9/34
[52] U.S. Cl. ........................................ 395/467; 395/421.01
[58] Field of Search ................................. 395/455, 467, 395/494, 421.01

[56] References Cited

U.S. PATENT DOCUMENTS

| | | | |
|---|---|---|---|
| 4,977,498 | 12/1990 | Rastegar et al. | 395/455 |
| 5,091,851 | 2/1992 | Shelton et al. | 395/455 |
| 5,170,476 | 12/1992 | Laakso et al. | 395/467 |
| 5,392,414 | 2/1995 | Yung | 395/455 |
| 5,450,555 | 9/1995 | Brown, III et al. | 395/375 |
| 5,471,591 | 11/1995 | Edmondson et al. | 395/375 |

OTHER PUBLICATIONS

Intel Corporation, *IntelDX4™ Processor Data Book*, Feb 1994, pp. 6–1 to 6–5.

*Primary Examiner*—David L. Robertson
*Attorney, Agent, or Firm*—Irell & Manella LLP

[57] ABSTRACT

The architecture of the cache memory of the present invention includes a data RAM, a TAG RAM, a controller and pad logic on a single integrated circuit chip. The cache memory is coupled to a CPU and a memory bus controller over a host bus. The host bus receives read data from the cache memory and provides write data to the cache memory. The cache memory controller provides signals to the memory bus controller to indicate whether data accessed by the CPU resides in the cache memory. The present invention increases memory speed by allowing circuit elements in the cache memory to operate during both phases of a system clock signal.

4 Claims, 3 Drawing Sheets

DIGITAL CIRCUIT FOR PERFORMING MULTICYCLE ADDRESSING IN A DIGITAL MEMORY

BACKGROUND OF THE INVENTION

1. Field of the Invention

The present invention relates to a digital memory device and, more specifically, to an integrated cache random access memory (RAM).

2. Art Background

Digital systems that include a central processing unit (CPU) that frequently access data in a random access main memory often include a cache memory to provide faster access to data. The cache memory is located relatively close to the CPU and typically implements high speed logic circuitry. The cache memory stores a subset of the data that resides in the main memory. When the CPU attempts to read data from the main memory, the cache memory is checked to determine whether the accessed data resides in the cache memory. If so, the data is read from the cache memory which is faster than accessing main memory.

The cache memory contains data that is most likely to be accessed by the CPU. Typically, this data is located at an address adjoining the address of data that is currently read by the CPU. Thus, if the CPU reads data that does not currently reside within the cache memory, the data adjoining the currently accessed data is written from the main memory to the cache memory to update the cache memory. In this manner, the cache memory contains the data that the CPU will most likely access, which in turn increases the performance of the computer system since the cache memory access is faster than an access from main memory.

Prior art cache memories are typically fabricated on three different integrated circuits. By employing three integrated circuits instead of one, the size of the cache memory is increased. Further, three integrated circuits consume more power than a single integrated circuit.

The present invention provides a cache memory with a novel architecture that may be implemented on a single integrated circuit chip.

SUMMARY OF THE INVENTION

The architecture of the cache memory of the present invention includes a data RAM, a TAG RAM, a controller and pad logic on a single integrated circuit chip. The cache memory is coupled to a CPU and a memory bus controller over a host bus. The host bus receives data read from the cache memory and provides write data to the cache memory. The cache memory controller provides signals to the memory bus controller to indicate whether data accessed by the CPU resides in the cache memory.

The present invention increases memory speed by allowing circuit elements in the cache memory to operate during both phases of a system clock signal. A novel architecture implemented with multiplexers and latches allows addresses to be provided to memory decoders while the system clock signal is in a low state. The architecture also allows memory addresses to be provided to the memory decoders over a number of clock cycles. These and other advantages of the present invention will be apparent from the detailed description of the invention.

DETAILED DESCRIPTION OF THE INVENTION

The present invention discloses an integrated cache memory. Although the present invention is described with reference to specific circuits, block diagrams, and signals, etc., it will be appreciated by one of ordinary skill in the art that such details are disclosed simply to provide a more thorough understanding of the present invention. It will therefore be apparent to one skilled in the art that the present invention may be practiced without these specific details. In other instances, well known circuits are shown in block diagram form in order not to obscure the present invention unnecessarily.

The present invention is related to the following applications, which are incorporated herein by reference:

"HIGH PERFORMANCE DYNAMIC COMPARE CIRCUIT," filed Nov. 9, 1994, Ser. No. 08/336,543, by Atul V. Ghia, Pradip Banerjee, and Patrick T. Chuang;

"DUTY CYCLE INDEPENDENT TUNABLE CLOCK," filed Nov. 4, 1994, Ser. No. 08/334,687, by Pradip Banerjee, Patrick Chuang, and Atul V. Ghia;

"METHOD AND APPARATUS FOR CASCADING OF CACHE MEMORY DEVICES," filed Nov. 9, 1994, Ser. No. 08/336,550, by Simon Lau, Atul Ghia, and Pradip Banerjee;

"SINGLE CYCLE FLUSH FOR RAM MEMORY," filed Nov. 30, 1994, Ser. No. 08/346,739, by Pradip Banerjee, Atul V. Ghia, and Patrick Chuang;

"SCHEME TO TEST/REPAIR MULTIPLE LARGE RAM BLOCKS," filed Nov. 30, 1994, Ser. No. 08/346,740, by Pradip Banerjee, Simon Lau, and Atul Ghia;

"A CHARGE SHARED PRECHARGE SCHEME TO REDUCE COMPARE OUTPUT DELAYS," filed Nov. 9, 1994, Ser. No. 08/336,524, by Pradip Banerjee, Simon Lau, and Atul Ghia;

"A SENSE AMPLIFIER COMMON MODE DIP FILTER CIRCUIT TO AVOID FALSE MISSES," filed Nov. 9, 1994, Ser. No. 08/336,523, by Pradip Banerjee, Atul V. Ghia, and Patrick T. Chuang.

Figure 1:
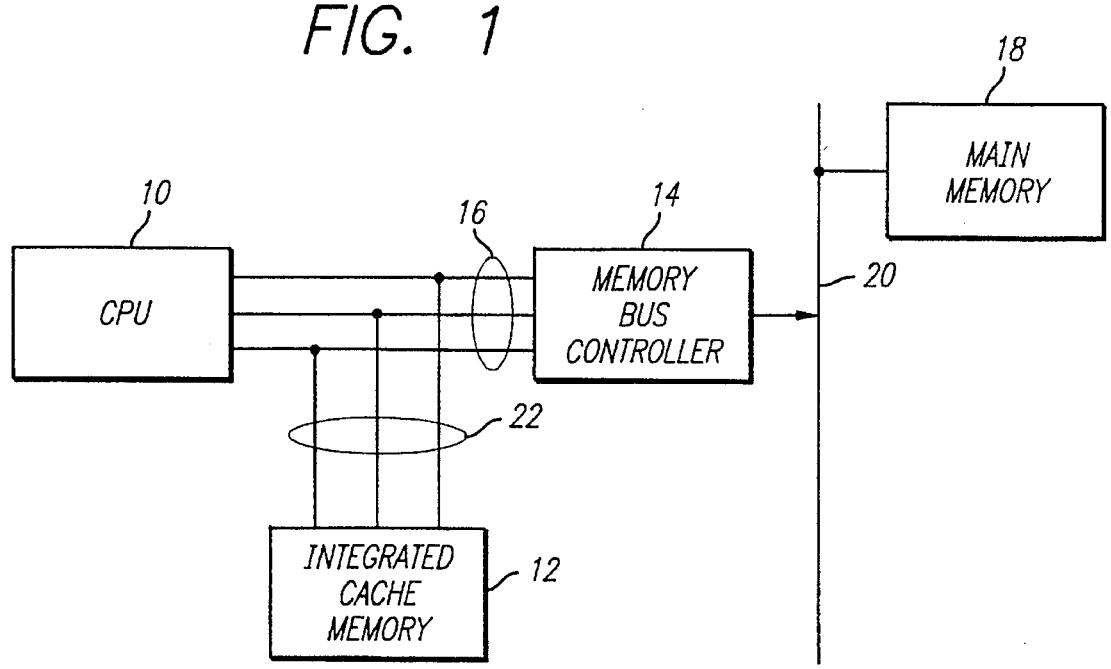
FIG. 1 is a block diagram of a digital system with a central processing unit, a main memory and a cache memory.

FIG. 1 is a block diagram of a digital system that includes a cache memory. As illustrated in the figure, a central processing unit (CPU) 10 is coupled to a memory bus controller 14 over a host bus 16. The host bus 16 includes control lines 15, address lines 17, and data lines 19. The memory bus controller 14 is coupled to a main memory 18 over a system bus 20. A cache memory 12 is coupled to the bus 16 over a bus 22. The cache memory 12 stores a subset of the data stored in the main memory 18, and the CPU 10 can access data in the cache memory 12 more quickly than the CPU 10 can access data in the main memory 18. Typically, the cache memory 12 will store the data that the CPU 10 is most likely to access, thereby increasing the speed of computation.

Since the cache memory 12 stores only a subset of the data in the main memory 18, the cache memory must be checked to determine whether data with a particular address resides in the cache memory 12. If the CPU 10 attempts to read data that resides in the cache memory 12, then the data will be supplied from the cache memory 12 to the CPU 10. If the CPU 10 attempts to read data that does not reside in the cache memory 12, the data is supplied from the main memory 18 after the cache memory 12 notifies the memory bus controller 14 that the data does not reside in the cache memory 12. The memory bus controller 14 initiates a read operation from the main memory 18 over the bus 20 and the data is then provided to the CPU 10 over the bus 16.

When the CPU 10 attempts to write data to an address that resides in the cache memory 12, then the data is written to the cache memory 12 and the main memory 18 to ensure consistency between the data in the cache memory 12 and the main memory 18. When the CPU 10 attempts to write data to an address that does not reside in the cache memory 12, only the main memory 18 is updated.

A digital system may comprise a plurality of cache memories where each cache memory contains a different subset of the main memory 18. The related application "METHOD AND APPARATUS FOR CASCADING OF CACHE MEMORY DEVICES," filed Nov. 9, 1994, Ser. No. 08/336,550 discloses an improved interface between a cache memory and a CPU that allows a plurality of cache memories to be cascaded. It will be appreciated that the cache memory 12 of the present invention may be cascaded with other cache memories according to the teachings of the above-referenced related application.

In prior art systems, the cache memory 12 typically comprises a plurality of integrated circuit chips. The present invention's cache memory 12 comprises a data RAM, a TAG RAM and a controller. The data RAM stores data, the TAG RAM stores high order addresses that correspond to the data in the data RAM and the controller coordinates data transfers between the TAG RAM and the data RAM and performs other functions. In the prior art, the TAG RAM, data RAM and controller are typically fabricated on distinct integrated circuits. According to the present invention, the cache memory 12 is comprised of a single integrated circuit chip, thereby decreasing the size of the cache memory 12 and improving system performance.

Figure 2A:
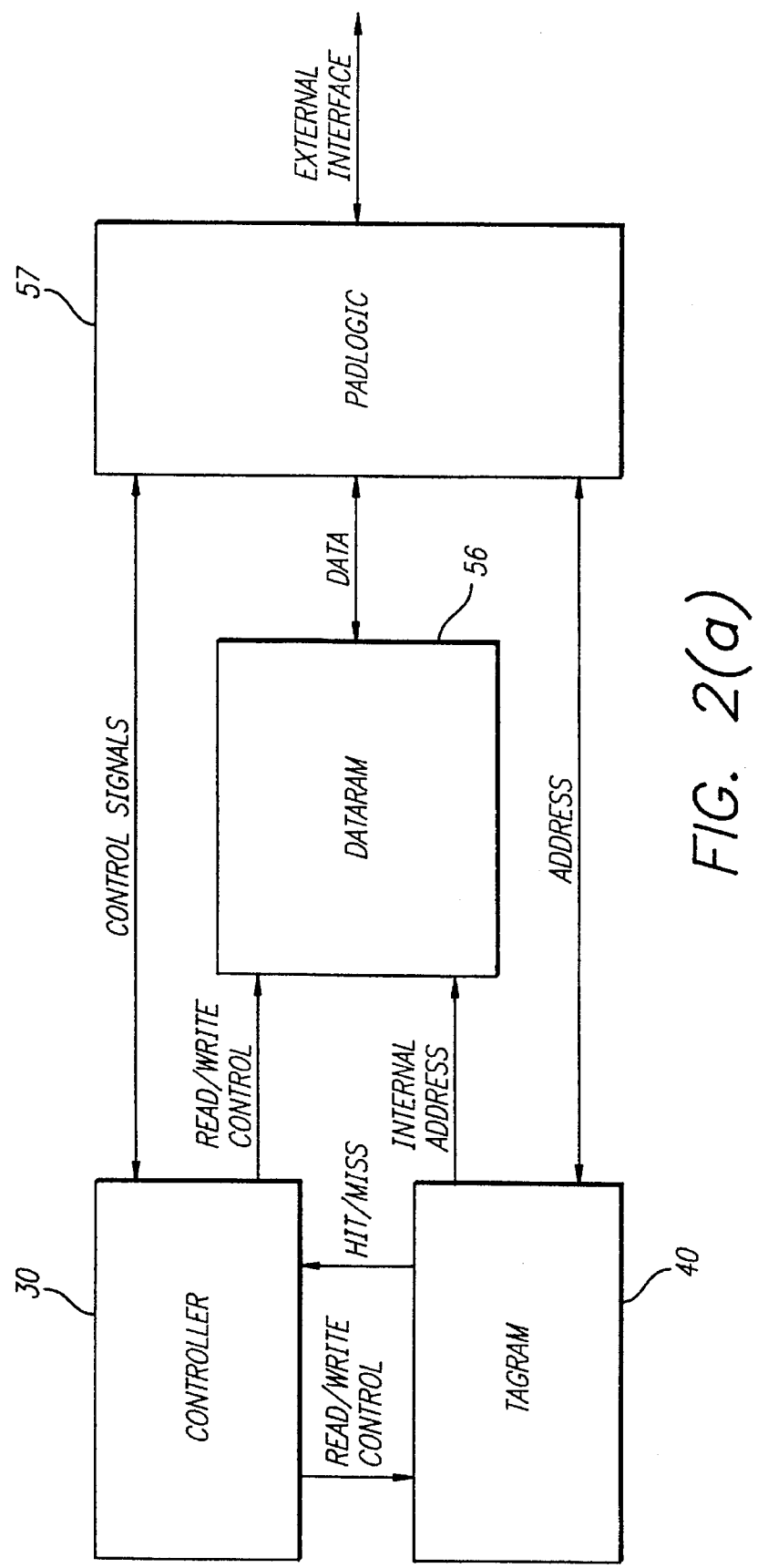
FIG. 2(a) is a block diagram of the integrated cache memory of the present invention.

FIG. 2(a) is a general block diagram of the integrated cache memory 12 of the present invention. The integrated cache memory 12 comprises a TAG RAM 40, a data RAM 56, a controller 30, and pad logic represented by block 57. The address of data for an attempted read or write operation is provided from the host bus 16, as illustrated in FIG. 1, over bus 16 to the pad logic 57 as illustrated in FIG. 2(a). Read and write data is transferred between the cache memory 12 and the host bus 16 by the pad logic 57. Signals indicating whether the cache memory 12 contains data accessed by the CPU 10 are provided to the memory bus controller 14, illustrated in FIG. 1, by the cache memory 12.

In operation, a memory request is received by the pad logic 57 through an external interface. As illustrated in FIG. 2(a), the address for the memory request is coupled to the TAG RAM 40. If the address results in a TAG RAM "hit", the TAG RAM 40 generates an internal address which is coupled to the data RAM 56. The data RAM 56 retrieves the data corresponding to the address request and provides the data to the pad logic 57, which is then reported out through the external interface. As illustrated, the TAG RAM 40 is coupled to the controller 30 and receives read/write control signals from the controller 30. In the event that the address coupled to the TAG RAM does not result in a hit, but rather in a "miss", the miss is reported to the controller 30 which provides a signal to the pad logic 57 indicating that requested data is not stored within the cache memory 12.

Figure 2B:
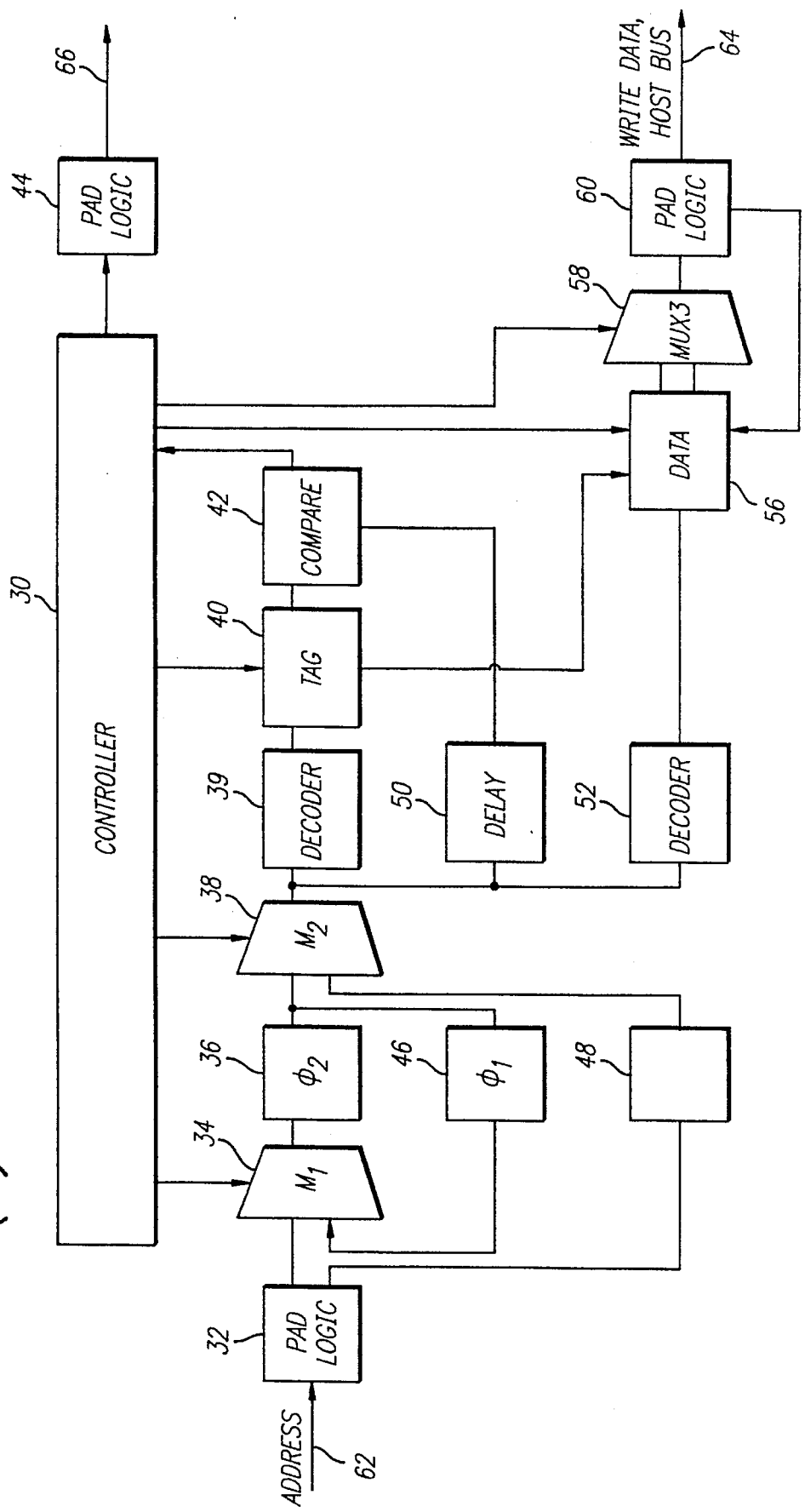
FIG. 2(b) is a more detailed block diagram of the integrated cache memory of the present invention.

Referring now to FIG. 2(b), a more detailed block diagram of the integrated cache memory 12 for the present invention is disclosed. The pad logic 57 shown in FIG. 2(a) is illustrated in FIG. 2(b) as pad logic 32, pad logic 44, and pad logic 60 for purposes of providing a functional description of the present invention.

Since the TAG RAM 40 and the data RAM 56 share the multiplexers 34 and 38, latches 36 and 46, and a flip-flop 48, the cache memory 12 is smaller than if the TAG RAM 40 and the data RAM 56 were fabricated on discrete integrated circuit chips.

As previously described, there are four possibilities for an attempted memory access by the CPU 10. The CPU 10 may read data that resides in the cache memory 12 or that only resides in the main memory 18, as illustrated in FIG. 1. The CPU 10 may attempt to write data to an address that resides in the cache memory 12 and the main memory 18 or only in the main memory 18. The operation of the integrated cache memory 12 illustrated in FIG. 2(b) will be described separately for these four operations. Finally, the two phase operation of the cache memory of the present invention will be described.

ATTEMPTED READ FOR DATA RESIDENT IN THE CACHE MEMORY 12

As illustrated in FIG. 2(b), the address of the read data is provided to the cache memory 12 over the bus 62. The pad logic 32 receives the address and provides the address to a multiplexer 34. The data indicating a read operation has been initiated is provided to the controller 30 by the pad logic 44 which receives over the bus 66 a signal that a read operation has been initiated. The controller 30 provides signals to the multiplexer 34 and a multiplexer 38 that causes the address of the accessed data to be provided to a plurality of decoders 39 and 52 and a delay circuit 50. The details of the operation of the multiplexers 34 and 38 and the latches 36 and 46 and the flip-flip 48 will be described more fully below.

The controller 30 also simultaneously initiates a read request to the TAG RAM 40 and the data RAM 56. The address of the read data is provided to the TAG RAM 40 by the decoder 39 and the data RAM 56 by the decoder 52.

In a preferred embodiment, the TAG RAM 40 and the data RAM 56 are two way set associative memories. Thus, both the TAG RAM 40 and the data RAM 56 are divided into two sections, where each section in the TAG RAM 40 corresponds to one section in the data RAM 56. The data RAM 56 has two bits that might correspond to the address of the accessed data. The TAG RAM 40 stores the high order address as data. If the high order address of the accessed data matches the high order address stored in the TAG RAM 40, the data in the corresponding section of the data RAM 56 is the desired data.

Both sections in the TAG RAM 40 are compared with the address provided by the decoder 39 to determine whether the corresponding section in the data RAM 56 contains the desired data. The comparison is performed by a compare circuit 42 that receives the address of the read data from the delay circuit 50. The related application "HIGH PERFORMANCE DYNAMIC COMPARE CIRCUIT," filed Nov. 9, 1994, Ser. No. 08/336,543 discloses methods and apparatus for an improved compare circuit 42. The related application "A CHARGE SHARED PRECHARGE SCHEME TO REDUCE COMPARE OUTPUT DELAYS," filed Nov. 9, 1994, Ser. No. 08/336,524 discloses methods and apparatus for reducing the output delays of the compare circuit 42. The results of the comparison are provided to the controller 30.

Both sections of the data RAM 56 provide data from the addresses that match the lower order address of the read data. The controller 30 provides a signal to a multiplexer 58 that indicates which of the sections of the TAG RAM 40 matched the high order address of the read data. The multiplexer 58 then selects the data from the data RAM 56 that corresponds to the section of the TAG RAM 40 that matched the high order address of the read data. The data is provided from the multiplexer 58 to the pad logic 60 which provides the data to the host bus 16 over the bus 64. The read operation is complete when the controller 30 and the pad logic 44 provide a signal over the bus 66 to the memory bus controller 14, as illustrated in FIG. 1, that the accessed data resides in the cache memory 12.

ATTEMPTED READ FOR DATA NOT RESIDENT IN THE CACHE MEMORY 12

In the case where the data is not resident in the cache memory 12, the initial operations are identical to the case where the data resides in the cache memory 12. The address of the read data is provided to the cache memory 12 over the bus 62. The pad logic 32 receives the address of the accessed data and provides it to the multiplexer 34. The data indicating a read operation has been initiated is provided to the controller 30 by the pad logic 44. The controller 30 provides signals to the multiplexers 34 and 38 that cause the address to be provided to the decoders 39 and 52 and the delay circuit 50. The controller 30 also simultaneously initiates a read request to the TAG RAM 40 and the data RAM 56.

The address of the read data is provided to the TAG RAM 40 by the decoder 39 and the data RAM 56 by the decoder 52. Both sections in the TAG RAM 40 are compared with the address provided by the decoder 39 as previously described and the results of the comparison are provided to the controller 30. Both sections of the data RAM 56 provide data to the multiplexer 58 as previously described. The controller 30 provides a signal to the multiplexer 58 that indicates that neither of the sections of the TAG RAM 40 matched the high order address of the read data.

Since the read data does not reside in the cache memory 12, the controller 30 provides a signal to the memory bus controller 14 to read adjoining data from the main memory 18. The adjoining data from the main memory 18 is written to the cache memory 12 on the assumption that it is the most likely data that will be subsequently accessed by the CPU 10. To write the appropriate data from the main memory 18 to the cache memory 12, the TAG RAM 40, as illustrated in FIG. 2(b), is prepared for a line fill by the controller 30. The data from the main memory 18 is provided to the data RAM 56 by the pad logic 60 which receives the data over the bus 64. The TAG RAM 40 is then provided with the appropriate addresses of the data that is written to the data RAM 56. The cache memory 12 is thus updated with data from the main memory 18.

ATTEMPTED WRITE TO AN ADDRESS RESIDENT IN THE CACHE MEMORY 12

When the CPU 10 attempts to write data to an address resident in the cache memory 12, both the cache memory 12 and the main memory 18 must be provided with the write data to ensure that the cache memory 12 and the main memory 18 have identical data for those addresses stored in the cache memory 12.

For a write operation, the initial steps are identical to those previously described. Specifically, the address of the accessed data is provided to both sections of the TAG RAM 40 to determine whether the data is resident in one of the two sections of the data RAM 56. If the compare circuit 42 indicates that the TAG RAM 40 contained a matching address, the controller 30 provides a signal indicating a match to the pad logic 44 which in turn provides a signal over the bus 66 to the bus 22, as illustrated in FIG. 1. The write data is then provided to the data RAM 56 through the pad logic 60 and the corresponding address in the TAG RAM 40 is updated. In a preferred embodiment, data is simultaneously written to the data RAM 56 and the main memory 18.

ATTEMPTED WRITE TO AN ADDRESS NOT RESIDENT IN THE CACHE MEMORY 12

For a write operation where the address is not resident in the cache memory 12, the initial steps are identical to those previously described for a write operation where the address is resident in the cache memory 12. Specifically, the address of the accessed data is provided to both sections of the TAG RAM 40 to determine whether the data is resident in one of the two sections of the data RAM 56. If the compare circuit 42 indicates that the TAG RAM 40 did not contain a matching address, the controller 30 provides a signal indicating a miss to the pad logic 44 which in turn provides a signal over bus 66 to the bus 22, as illustrated in FIG. 1. The data is then written only to the main memory 18.

TWO PHASE OPERATION

Figure 3:
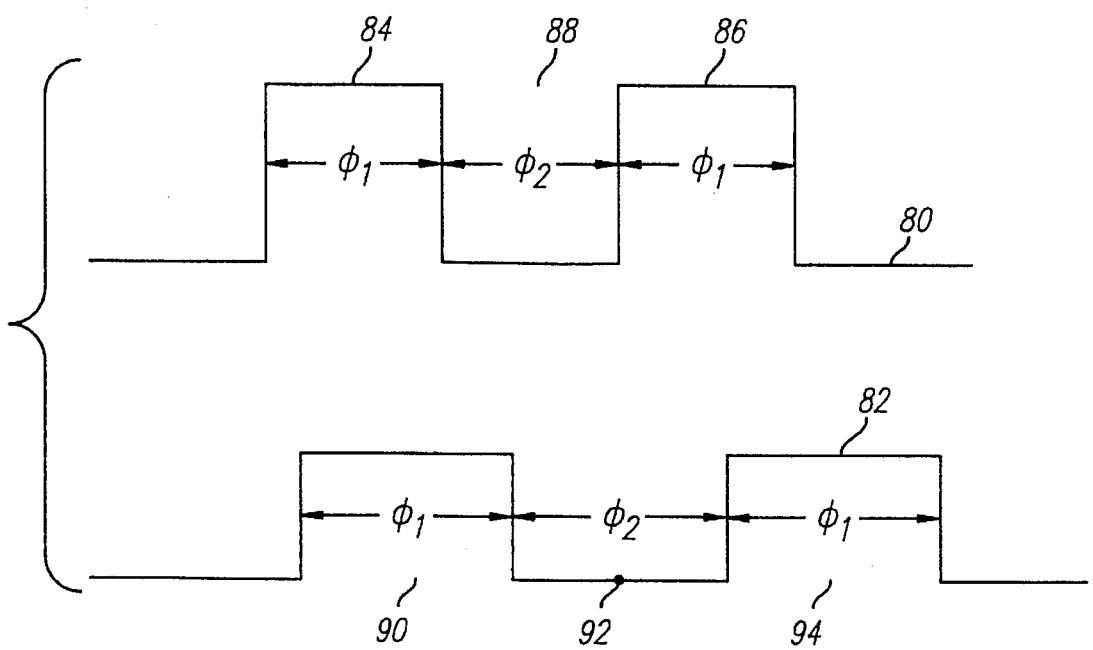
FIG. 3 illustrates the two phases of two clock waveforms.

The cache memory as illustrated in FIG. 2(b) operates in two phases to increase memory speed. FIG. 3 illustrates two waveforms 80 and 82 provided by a digital clock. The waveform 80 represents a sample output of an external system clock, where the cycle time for a given cycle is the sum of the periods 84 and 88. In certain prior art memories, the circuit elements in the memory are active only when the signal provided by a digital clock is at a high state. As illustrated in FIG. 3 with reference to waveform 80, all memory operations must occur in phase 1 periods 84 and 86. For example, a decoder may be provided with an address during the period 84 but the decoder may not process the signal during phase 2 period 88 but must wait until period 86 to decode the signal.

In contrast, the cache memory of the present invention provides for two phase operation. As illustrated in FIG. 3 with reference to waveform 82 which is an internal clock, the present invention's memory elements may operate in both phase 1 periods 90 and 94 and phase 2 period 92, thereby permitting pipelined circuit operations. For example, during the phase 2 period 92, an address may be provided to a decoder and during phase 1 period 94, the decoder may process the address. The two phase operation increases the speed of the memory by allowing memory elements to process data while the signal provided by a clock is in a low state.

With reference to FIG. 2(b), the latches 36 and 46 implement a two phase addressing architecture. Specifically, data is provided to the decoders 39 and 52 during phase 2 of a clock signal. The latch 36 is transparent during phase 2 and stores address data during phase 1. Conversely, the latch 46 is transparent during phase 1 and stores address data during phase 2.

Frequently, memory access operations require multiple cycles, in which case the same address must be provided to the decoders 39 and 52. The latches 36 and 46 allow the same address to be provided to the decoders 39 and 52 over multiple clock cycles while allowing new addresses to be provided to the decoders 39 and 52 when a multiple access cycle is not proceeding. During phase 1, the multiplexer 34 selects between the address of new data, where the address is provided by the pad logic 32 as previously described, and the address of previously accessed data, which is stored in the latch 46 and provided to the multiplexer 34 during phase 1.

The address data is provided to the decoders 39 and 52 during phase 2. During phase 1, the multiplexer 34 selects the new address or the old address based upon selection signals provided by the controller 30. If the new address is selected, it is stored in the latch 36 during phase 1. During phase 2, the address in the latch 36 is provided to the decoders 39 and 52 through the multiplexer 38, which will be described more fully below. Also during phase 2, the address in the latch 36 is provided to the latch 46 which stores the address during phase 2. As previously described, during phase 1, if the address of the previous memory access data is again required, the multiplexer 34 selects the address provided by the latch 46 during phase 1. In this manner, an address may be provided to the decoders 39 and 52 for any number of clock cycles. Further, by providing addresses to the decoders 39 and 52 during phase 2, the speed of the memory is increased.

A flip flop 48 provides for the storage of an additional address. The flip flop 48 is provided with a data address from the pad logic 32. The flip flop 48 stores this address and provides it to the multiplexer 38. The controller 30 provides a control signal to the multiplexer 38 to select between the address provided by the flip flop 48 and the latch 36.

The copending application entitled "DUTY CYCLE INDEPENDENT TUNABLE CLOCK," filed Nov. 4, 1994, Ser. No. 08/334,687, provides methods and apparatus for implementing an internal clock with a duty cycle that is tunable and independent of a system clock. The internal clock provided by the "DUTY CYCLE INDEPENDENT TUNABLE CLOCK" may be used in conjunction with the present invention to provide a two phase clock signal with a first phase and a second phase that satisfy the timing requirements of the cache memory 12 of the present invention.

While the invention has been described in conjunction with preferred embodiments, it is evident that numerous alternatives, modifications, variations and uses will be apparent to those skilled in the art in light of the foregoing description.

We claim:

1. An integrated cache memory comprising:
    a multi-way set associative TAG RAM on a chip;
    a controller on said chip coupled to the TAG RAM;
    pad logic on said chip coupled to the TAG RAM and the controller;
    a first multiplexer coupled to the pad logic for receiving an address;
    a decoder coupled to the TAG RAM for decoding an address;
    a first latch with an input and an output, the input of the first latch coupled to the output of the first multiplexer and the output of the first latch coupled to the input of the second multiplexer, the first latch storing addresses during a first phase of a digital clock cycle and for providing addresses to the decoder during a second phase of a digital clock cycle; and
    a second latch with an input and an output, the input of the second latch coupled to the output of the first latch and the output of the second latch coupled to an input of the first multiplexer, the second latch storing addresses during the second phase of a digital clock cycle and for providing addresses to the first multiplexer during the second phase of a digital clock cycle, the first and second phases together comprising a single digital clock cycle; and
    wherein the first multiplexer is coupled to receive selection inputs from the controller to select between an address from the pad logic and an address from the second latch and wherein said controller is configured to select the address provided by the second latch when a multiple cycle address operation is occurring, the address provided by the second latch being identical to an address previously provided to the decoder.

2. The cache memory according to claim 1 further comprising:
    a second multiplexer with at least two data inputs and an output, one input of the second multiplexer coupled to the output of the first latch; and
    a flip-flop with an input and an output for storing an address, the input of the flip flop coupled to the pad logic, the output of the flip flop coupled to the second input of the multiplexer such that the multiplexer selects between an address stored in the flip flop and an address stored in the first latch.

3. The cache memory according to claim 2 wherein the second multiplexer is coupled to receive selection inputs from the controller to select between an address from the first latch and an address from the flip flop.

4. The integrated cache memory of claim 1 wherein said multi-way set associative TAG RAM comprises a two way set associative TAG RAM.

* * * * *